July 31, 1951  J. JANDASEK  2,562,463
ROTARY HYDRAULIC TORQUE CONVERTER
Original Filed Dec. 23, 1939
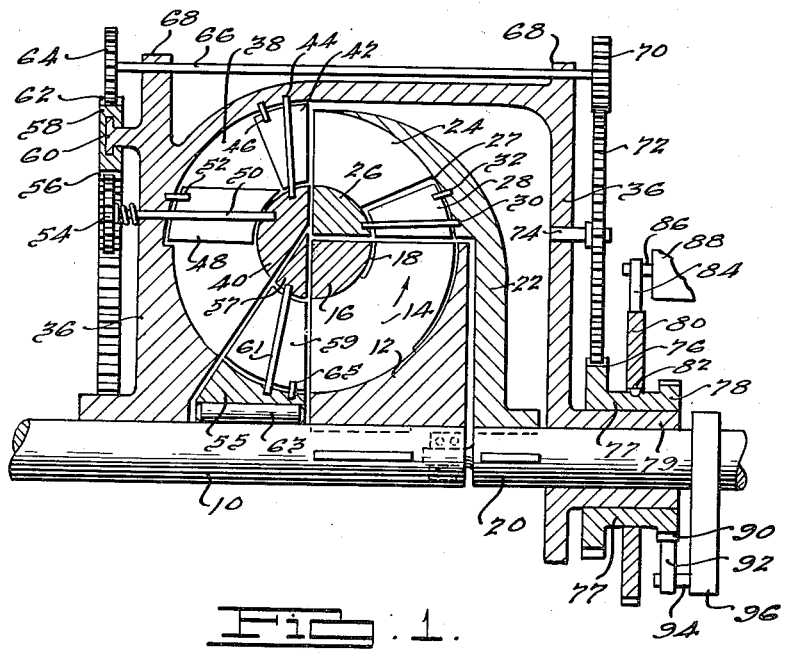
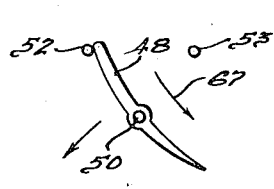 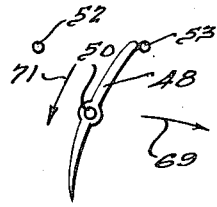
INVENTOR.
Joseph Jandasek.
BY
ATTORNEY.

Patented July 31, 1951

2,562,463

UNITED STATES PATENT OFFICE 2,562,463

ROTARY HYDRAULIC TORQUE CONVERTER

Joseph Jandasek, Highland Park, Mich., assignor to Bendix Aviation Corporation, South Bend, Ind., a corporation of Delaware Original application December 23, 1939, Serial No. 310,785, now Patent No. 2,427,458, dated September 16, 1947. Divided and this application January 31, 1944, Serial No. 520,425

4 Claims. (Cl. 60—54)

This invention relates to transmissions and more particularly to fluid transmissions operative automatically as torque converters or as fluid clutches dependent on variations of load transmitted.

An object of this invention is to provide a fluid transmission having angularly movable gates adapted to be locked against rotation to operate the transmission as a torque converter, and to rotate in the power transmitting fluid circuit in the direction of fluid flow to function as auxiliary turbine members when the transmission is operating as a fluid clutch.

A further object of the invention resides in the provision of a transmission having angularly movable gates controlled by suitable motion transmitting means to vary the angular relation of the gates to function as a reaction member or as an auxiliary turbine.

Another object of the invention is to provide a fluid transmission having a rotatable housing enclosing cooperating impeller and turbine members wherein the housing may be operably connected to the driven shaft to transmit power thereto when the transmission is functioning as a fluid clutch, and to be locked against rotation when the transmission is functioning as a torque converter.

Still a further object of the invention resides in the provision of coupling means operated by slight rotation of a member having fluid deflecting blades to operably connect the member to a stationary member or to a driven shaft.

Another object of the invention is to provide fluid deflecting members capable of functioning in one position as guide wheel gates to rectify fluid flow, and in another position to operate as auxiliary turbine vanes adapted to absorb energy from circulating power transmitting fluid.

Yet another object is to provide a rotatable housing having angularly movable fluid deflecting members wherein motion transmitting means are provided to operably connect the housing to a stationary member or to a driven member in response to variations of fluid reaction in the power transmitting fluid circuit to operate the transmission as a torque converter or as a fluid clutch.

A further object is to provide a fluid transmission having angularly adjustable fluid deflecting members controlled by gearing associated with the fluid transmission.

Another object of the invention is to provide a regenerative fluid transmission having adjustable fluid deflecting members operative to provide for continued regeneration of power to the driving shaft when the speed of rotation of the driven member increases relative to the speed of rotation of the driving shaft.

Other objects and advantages of this invention will be apparent from the following detailed description considered in connection with the accompanying drawing, submitted for purposes of illustration only and not intended to define the scope of the invention, reference being had for that purpose to the subjoined claims.

In the drawing wherein similar reference characters refer to similar parts throughout the several views.

Fig. 1 is a longitudinal sectional view of a fluid transmission embodying the invention.

Fig. 2 is a sectional view illustrating the angular relation of the guide wheel gates when the transmission is operating as a torque converter.

Fig. 3 is a view similar to Fig. 2 illustrating the position of the gates when the transmission is operating as a fluid clutch.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The fluid transmission illustrated in Fig. 1 includes a driving shaft 10 having thereon an impeller hub or web 12, and the web 12 has thereon a plurality of spaced generally radially extended impeller vanes 14 secured to an impeller shroud 16 and cooperating with the impeller web 12 to provide a power transmitting fluid circuit 18.

A driven shaft 20 preferably axially aligned with the driving shaft 10 has secured thereon a radially extended turbine web 22 having a plurality of spaced turbine vanes 24 secured to a turbine shroud 26, and cooperating with the turbine web 22 to provide a turbine channel 27 aligned with the impeller channel 18 and operative to absorb energy from the circulating fluid and to deliver it to the driven shaft 20.

The turbine is provided with a plurality of spaced vanes 28 fixed to shafts 30 journaled in the web 22 and the shroud 26. Spaced stops 32 preferably positioned in the turbine web 22 are provided to limit the angular movement of the vanes 28.

A housing 36 receives the driving and driven shafts 10 and 20. The housing has a channel 38 interposed between a portion of the housing 36 and a shroud 40. The channel 38 is aligned with the outlet of the turbine channel 27 and the inlet of the impeller channel 18 and cooperates therewith to provide a power transmitting fluid circuit.

Gates 42 fixed to shafts 44 journaled in the wall of the housing 36 and shroud 40 are adjacent the outlet of the turbine channel 27, and stops 46 serve to limit the angular movement of the gates 42.

Main gates 48 fixed to shafts 50 journaled in the housing 36 and in the shroud member 40 are angularly movable between spaced stops 52 and 53 as illustrated in Figs. 1 to 3 inclusive.

An auxiliary turbine includes a combined hub and web 55 and a shroud 57 supporting spaced vanes 59 fixed to shafts 61 journaled on the web and shroud. This auxiliary turbine receives energy from the power transmitting fluid, and transmits it through a one-way driving means 63 to the driving shaft 10. Spaced stop members 65 adjacent the trailing edges of the vanes 59 serve to limit angular movement of the vanes 59. Energy is thus absorbed in the auxiliary turbine passage and is redirected to the driving shaft 10 to produce a regenerative force to increase the applied power. The angular movement of the vanes 59 causes them to deflect the fluid in response to variations of fluid reaction and accordingly the regenerative function is therefore continued longer as the turbine or driven shaft speed increases than is possible where non-pivotal blades are employed in a regenerative member.

The shafts 50 to which the main gates 48 are secured project through the housing 36 and are provided with pinions 54 in mesh with an internal ring gear 56 on a member 58 mounted for oscillation on a carrier 60 relative to the housing 36 so as to vary the angular relation of the gates 48 as illustrated in Figs. 2 and 3.

The blades 28 on the turbine, the blades 42 and 48 on the guide wheel and the blades 59 on the auxiliary turbine swing in the fluid circuit in response to changes of the fluid flow due to different speeds and load ratios.

When the gates 48 engage the stops 52 as illustrated in Fig. 2 fluid is deflected in the direction of the arrow 67 and the transmission functions as a torque converter to transmit multiplied torque to drive the driven shaft at reduced speed. When torque multiplication is no longer required to transmit the load to which the driven shaft 20 is subjected, the fluid reaction in the guide wheel exerts a force on the flexible gates 48 tending to rotate the housing 36 in the forward direction as illustrated by the arrow 69 in Fig. 3, whereupon the gates 48 are actuated through the gearing hereinafter described to move into engagement with the stops 53 as illustrated in Fig. 3 whereupon the fluid is deflected in the direction of the arrow 71 and the device functions as a fluid clutch to transmit power with substantially no torque multiplication. During operation as a fluid clutch, the guide wheel member is operably connected through the one-way driving means to the driven shaft to function as an auxiliary turbine.

The member 58 has thereon an external ring gear 62 in mesh with a pinion 64 fixed to a shaft 66 journaled in brackets 68 on the housing 36. The shaft 66 has thereon a pinion 70 in mesh with a gear 72 mounted on a shaft 74 on the housing 36. The gear 72 also meshes with a gear 76 carried by a sleeve 77 journaled on an axially extended portion 79 of the housing 36 on the driven shaft 20. A gear 80 is fixed to the sleeve 77 as by means of a key 82, and a braking means such for example as a pawl 84 carried by a shaft 86 secured in a stationary member 88 may be provided to lock the gear 80 and housing 36 against reverse rotation when the transmission is functioning as a torque converter.

A gear 90 on the sleeve 77 is operably connected to the driven shaft 20 through a one-way driving mechanism such for example as a pawl 92 mounted on a shaft 94 carried by a flange 96 secured to the driven shaft 20.

The operation is as follows. Power applied to the driving shaft 10 rotates the impeller to energize fluid in the impeller channel 18 and direct it to the turbine channel 27. Energy absorbed in the turbine channel is directed through the turbine web 22 to the driven shaft 20.

At reduced speed, the fluid reaction exerted on the main gates 48 of the guide wheel exerts a force thereon tending to rotate the guide wheel backwardly. The gates 48 move into engagement with the stop 52 as illustrated in Fig. 2 to rectify the fluid flow and redirect it in such a manner as to afford the transmission of power with torque multiplication.

The auxiliary turbine vanes 59 absorb a portion of the energy from the power transmitting fluid and direct it through the web 55 and one-way driving means 63 to increase the power applied to the driving shaft 10. The auxiliary turbine vanes 59 also direct the fluid to enter the impeller channel 18 at an appropriate angle to minimize fluid turbulence.

When the transmission is functioning as a torque converter to transmit power at reduced speed with torque multiplication, the one-way braking means illustrated by the pawl 84 between the stationary member 88 and the gear 80 functions through the sleeve 77, gear 76, gear 72, pinion 70, shaft 66, pinion 64, ring gear 62 on the member 60, pinion 54, the blades 48 and stop 52 carried by the housing 36 to hold the housing 36 against rotation in the backward direction.

When the ratio between the power applied to the driving shaft 10 and the power to which the driven shaft 20 is subjected decreases to such a point that torque multiplication is no longer necessary to carry the load, the fluid reaction in the power transmitting fluid circuit changes angularly to such an extent that the housing 36 rotates slightly in the forward direction. This slight forward rotation of the housing is effective to release the one-way braking means 84 holding the housing 36 against backward rotation and is effective through the train of gears interposed between the shafts 50 to which the gates 48 are fixed and one-way clutch 92 to move the gates 48 angularly into engagement with the stop 53 as illustrated in Fig. 3. The power transmitting fluid is then deflected in the direction of the arrow 71 of Fig. 3, as the housing 36 rotates in the direction of the arrow 69 to absorb energy from the power transmitting fluid and direct it through the train of gears hereinabove recited to rotate the sleeve 77 on the driven shaft 20. Rotation of the sleeve 77 is effective through the ring gear 90 and one-way driving means 92 to transmit power through the flange 96 to the driven shaft 20. It will be noted that the gates 48 are such that they bow slightly as illustrated in Figs. 2 and 3 to transmit power with minimum fluid turbulence.

It will be noted that the rotatable housing 36 is locked against reverse rotation when the transmission is operating as a torque converter to rectify the fluid flow and direct the power transmitting fluid from the turbine to the impeller in such a manner that power may be transmitted with torque multiplication. When the need for torque multiplication no longer exists the rotatable housing 36 is released to rotate with the impeller and turbine members whereupon the guide wheel member functions as an auxiliary turbine to assist the main turbine in the transmission of power to the driven shaft 20.

This application is a division of my copending application Serial No. 310,785, filed December 23, 1939, which matured into Patent No. 2,427,458, dated September 16, 1947.

I claim:

1. A fluid transmission comprising driving and driven shafts, an impeller on the driving shaft and a turbine on the driven shaft cooperating with one another to provide a power transmitting fluid circuit, a guide wheel having thereon fluid deflecting gates movable angularly in the circuit, a stationary member, a train of gears and a braking means coupled between the gates and the stationary member effective to hold the guide wheel against backward rotation so as to rectify the fluid flow and transmit power from the driving shaft to the driven shaft with torque multiplication when the transmission is operating as a torque converter, and means under control of the gates effective to lock the guide wheel to the driven shaft so that it may function as an auxiliary turbine when the transmission is operating as a fluid coupling.

2. In a fluid transmission a driving shaft, an impeller on the driving shaft, a driven shaft, a turbine on the driven shaft, the impeller and turbine cooperating with one another to provide a power transmitting fluid circuit, a stationary member, a rotatable housing on the shafts, fluid deflecting blades carried by the housing and movable angularly in the fluid circuit, a gearing system connected to the blades, a one-way drive connecting the gearing system to the driven shaft, and a one-way brake connecting the gearing system to the stationary member for operation of the transmission as a fluid coupling.

3. A fluid transmission comprising driving and driven shafts, an impeller on the driving shaft, a turbine on the driven shaft, a rotatable housing having therein angularly movable fluid deflection blades cooperating with the impeller and turbine to provide a power transmitting fluid circuit, a stationary member, gear means controlled by the blades, motion transmitting means including a train of gears carried by the rotatable housing and actuated by the gear means, one-way braking means between said train of gears and the stationary member effective to lock the housing against backward rotation to operate the transmission as a torque converter, and one-way driving means between said train of gears and the driven shaft effective to lock the housing to the driven shaft so as to utilize the blades as an auxiliary turbine when the transmission is operating as a fluid coupling.

4. In a fluid transmission, driving and driven shafts, an impeller on the driving shaft, a turbine on the driven shaft, a rotatable housing having fluid deflecting blades movable angularly between fixed positions, and cooperating with the impeller and turbine members to provide a power transmitting fluid circuit, a stationary member, motion transmitting means including a train of gears carried by the housing and controlled by the angular movement of the blades, braking means between said train of gears and the stationary member effective to lock the housing against backward rotation so as to operate the transmission as a torque converter, and one-way driving means between said train of gears and the driven shaft operative to lock the housing to the driven shaft for forward rotation so as to operate said blades as an auxiliary turbine when the transmission is operating as a fluid coupling, the fluid deflecting blades assuming one of said fixed positions when the transmission is operating as a torque converter and being moved to said other fixed position by reaction of the fluid in the circuit to release the braking means and to engage the one-way driving means between the train of gears and the driven shaft.

JOSEPH JANDASEK.

REFERENCES CITED

The following references are of record in the file of this patent:

UNITED STATES PATENTS

| Number | Name | Date |
|---|---|---|
| 1,855,967 | Jandasek | Apr. 26, 1932 |
| 1,993,741 | Jandasek | Mar. 12, 1935 |
| 2,037,252 | Martyrer | Apr. 14, 1936 |
| 2,162,543 | Banner | June 13, 1939 |
| 2,205,794 | Jandasek | June 25, 1940 |
| 2,235,370 | Jandasek | Mar. 18, 1941 |
| 2,297,259 | Speiser | Sept. 29, 1942 |
| 2,313,645 | Jandasek | Mar. 9, 1943 |
| 2,339,483 | Jandasek | Jan. 18, 1944 |
| 2,341,921 | Jandasek | Feb. 15, 1944 |

FOREIGN PATENTS

| Number | Country | Date |
|---|---|---|
| 68,546 | Sweden | Dec. 3, 1929 |